US 8,810,447 B2
Aug. 19, 2014

(12) United States Patent
Huang et al.

(54) CALIBRATION DEVICES AND CALIBRATION METHODS (75) Inventors: Chun-Yen Huang, Yunlin County (TW); Chin-Chung Nien, Hsinchu (TW); Li-Yuan Chang, Taipei (TW); Chen-Ming Li, Taoyuan County (TW); Ya-Chung Yu, Chiayi (TW)

(73) Assignee: Industrial Technology Research Institute, Hsinchu (TW)

( * ) Notice: Subject to any disclaimer, the term of this patent is extended or adjusted under 35 U.S.C. 154(b) by 308 days.

(21) Appl. No.: 13/526,943

(22) Filed: Jun. 19, 2012

(65) Prior Publication Data
US 2013/0135139 A1  May 30, 2013

(30) Foreign Application Priority Data

Nov. 24, 2011  (TW) .............................. 100143074 A (51) Int. Cl.
*G01J 1/42* (2006.01)
*G01S 3/02* (2006.01)
*G01S 7/40* (2006.01)
*G01J 1/00* (2006.01)
*G01S 3/00* (2006.01)
*G01S 7/02* (2006.01)

(52) U.S. Cl.
USPC ............... 342/174; 356/213; 356/216; 374/1; 374/100; 374/120; 374/121; 374/122; 324/76.11; 324/76.12; 324/76.13; 324/7.14; 342/165; 342/173; 342/175; 342/195; 342/350; 342/351; 702/85; 702/99; 702/108; 702/127; 702/130; 702/134

(58) Field of Classification Search
USPC ................. 342/165, 169–175, 195, 350, 351, 342/1–11; 374/1, 2, 31, 32, 100, 120–122, 374/128, 130; 324/76.11, 76.12, 76.13, 324/76.14; 356/213, 216; 702/1, 2, 85, 99, 702/108, 127, 130, 134, 135
See application file for complete search history.

(56) References Cited

U.S. PATENT DOCUMENTS 3,628,151 A * 12/1971 Roeder ...................... 324/76.14
3,765,779 A * 10/1973 Hunt et al. .................... 356/216
(Continued)

FOREIGN PATENT DOCUMENTS

TW          I311193 B     6/2009
TW          M381060       5/2010
TW          I335733 B     1/2011

OTHER PUBLICATIONS

TW Office Action dated Dec. 11, 2013. pp. 1-10, Republic of China.
Lynch et al. "Passive Millimeter-Wave Imaging Module With Preamplified Zero-Bias Detection." IEEE Transactions on Microwave Theory and Techniques, VO. 56, No. 7, Jul. 2008, pp. 1592-1600.

(Continued)

*Primary Examiner* — Bernarr Gregory
(74) *Attorney, Agent, or Firm* — Birch, Stewart, Kolasch & Birch, LLP (57) ABSTRACT

A calibration device, capable of calibrating a gain of a radiometer, includes an actuator and a micro-electromechanical-system (MEMS) unit. The actuator receives a calibration signal outputted from a control unit. The MEMS unit is coupled to the actuator, in which the actuator enables the MEMS unit to shield an antenna of the radiometer according to the calibration signal, such that the radiometer generates an environmental signal according to an equivalent radiant temperature received from the MEMS unit, and the control unit calibrates the gain of the radiometer according to the environmental signal.

21 Claims, 6 Drawing Sheets

(56) References Cited

U.S. PATENT DOCUMENTS

| | | | |
|---|---|---|---|
| 4,864,309 A * | 9/1989 | Wiley et al. | 342/351 |
| 6,217,210 B1 * | 4/2001 | Roeder et al. | 374/1 |
| 6,439,763 B2 * | 8/2002 | Roeder et al. | 374/1 |
| 6,585,410 B1 * | 7/2003 | Ryan | 374/130 |
| 6,729,756 B2 * | 5/2004 | Sezai | 374/2 |
| 6,828,556 B2 | 12/2004 | Pobanz et al. | |
| 6,834,991 B2 * | 12/2004 | Roeder | 374/1 |
| 6,900,756 B2 * | 5/2005 | Salmon | 342/351 |
| 6,967,617 B1 * | 11/2005 | McMillan et al. | 342/195 |
| 7,199,570 B2 * | 4/2007 | Ammar | 324/76.14 |
| 7,495,199 B2 | 2/2009 | Jankowiak | |

OTHER PUBLICATIONS

May et al., "Design and Characterization of W-Band SiGe RFICs for Passive Millimeter-Wave Imaging." IEEE Transactions on Microwave Theory and Techniques, vol. 58, No. 5, May 2010, pp. 1420-1430.

Tomkins et al., "A Passive W-Band Imaging Receiver in 65-nm Bulk CMOS." IEEE Journal of Solid-State Circuits, vol. 45, No. 10, Oct. 2010, pp. 1981-1991.

Zhou et al., "A W-Band CMOS Receiver Chipset for Millimeter-WaveRadiometer Systems." IEEE Journal of Solid-State Circuits, vol. 46, No. 2, Feb. 2011, pp. 378-391.

* cited by examiner

CALIBRATION DEVICES AND CALIBRATION METHODS

CROSS REFERENCE TO RELATED APPLICATIONS

This Application claims priority of Taiwan Patent Application No. 100143074, filed on Nov. 24, 2011, the entirety of which is incorporated by reference herein.

BACKGROUND

1. Technical Field

The present technical field relates to calibration systems, and in particular relates to a calibration system capable of calibrating radiometers.

2. Description of the Related Art

Currently, radiometers for detecting microwaves are widely applied in imaging systems, such as the customs formalities or important meetings. However, radiometers need to operate with mechanical scan systems to scan a target object having a large surface, which takes much time. Radiometers arranged in an array can reduce the time spent on scanning, but calibration of each pixel of the radiometer array is difficult. Therefore, there is a need for a calibration system and a calibration method to calibrate a radiometer array.

SUMMARY

In light of the previously described problems, the disclosure provides an embodiment of a calibration device, capable of calibrating a gain of a radiometer, including an actuator and a micro-electromechanical-system (MEMS) unit. The actuator receives a calibration signal outputted from a control unit. The MEMS unit is coupled to the actuator, in which the actuator enables the MEMS unit to shield an antenna of the radiometer according to the calibration signal, such that the radiometer generates an environmental signal according to an equivalent radiant temperature received from the MEMS unit, and the control unit calibrates the gain of the radiometer according to the environmental signal.

The disclosure also provides an embodiment of a calibration system, capable of calibrating gains of a radiometer array having a plurality of radiometers, including a plurality of calibration devices and a control unit. The calibration devices are arranged in an array form, in which each of the calibration devices comprises an actuator and an MEMS unit. The actuator is configured to receive the calibration signal. The MEMS unit is coupled to the actuator, wherein the actuator enables the MEMS unit to shield an antenna of the corresponding radiometer according to the calibration signal, such that the radiometer generates an environmental signal. The control unit is configured to output the calibration signal, in which the control unit normalizes the gains of the radiometers according to the environmental signals The disclosure also provides a scan method suitable for an image system having a detection unit and a scan unit. The scan method includes the steps of: scanning a target area N times by the scan unit at a constant speed within a scan period, such that each of pixels in the target area is scanned N times by the scan unit, thereby N sub-detection values are generated for the each of the pixels; and adding up the N sub-detection values to generate a detection value of the each of the pixels.

A detailed description is given in the following embodiments with reference to the accompanying drawings.

BRIEF DESCRIPTION OF DRAWINGS

The present disclosure can be more fully understood by reading the subsequent detailed description and examples with references made to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The slope of the disclosure is best determined by reference to the appended claims.

Figure 1:
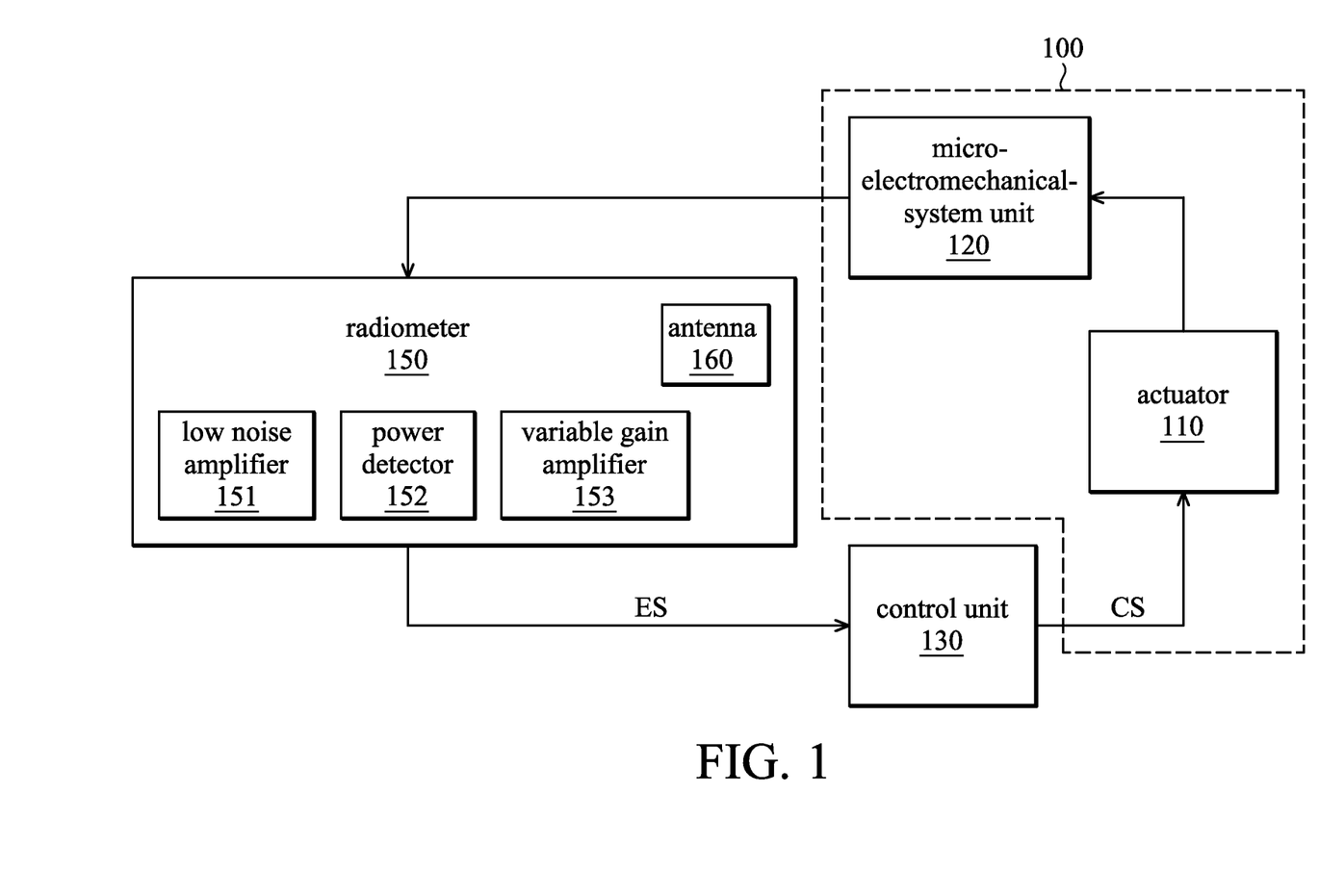
FIG. 1 illustrates a schematic view of a calibration device of the disclosure.

FIG. 1 illustrates a schematic view of a calibration device of the disclosure. As shown in FIG. 1, the calibration device 100 includes an actuator 110, a micro-electromechanical-system (MEMS) unit 120 and an insulation unit (e.g., an insulation unit 240 shown in FIG. 2, but not shown in FIG. 1) to calibrate a radiometer 150. In the embodiment, the radiometer 150 can be a microwave radiometer and includes a low noise amplifier 151, a power detector 152 and a variable gain amplifier 153. In detail, the actuator 110 receives a calibration signal CS outputted from a control unit 130. The insulation unit has a groove (e.g., the groove 290 shown in FIG. 2) and an antenna 160 of the radiometer 150 can be disposed in the groove. The MEMS unit 120 is coupled to the actuator 110, in which the actuator 110 enables the MEMS unit 120 to shield the antenna 160 according to the calibration signal CS, such that the radiometer 150 generates an environmental signal ES according to an equivalent radiant temperature outputted from the MEMS unit 120, thereby the control unit 130 calibrates the radiometer 150 according to the environmental signal ES, in which the equivalent radiant temperature is associated with the environmental temperature.

Figure 2:
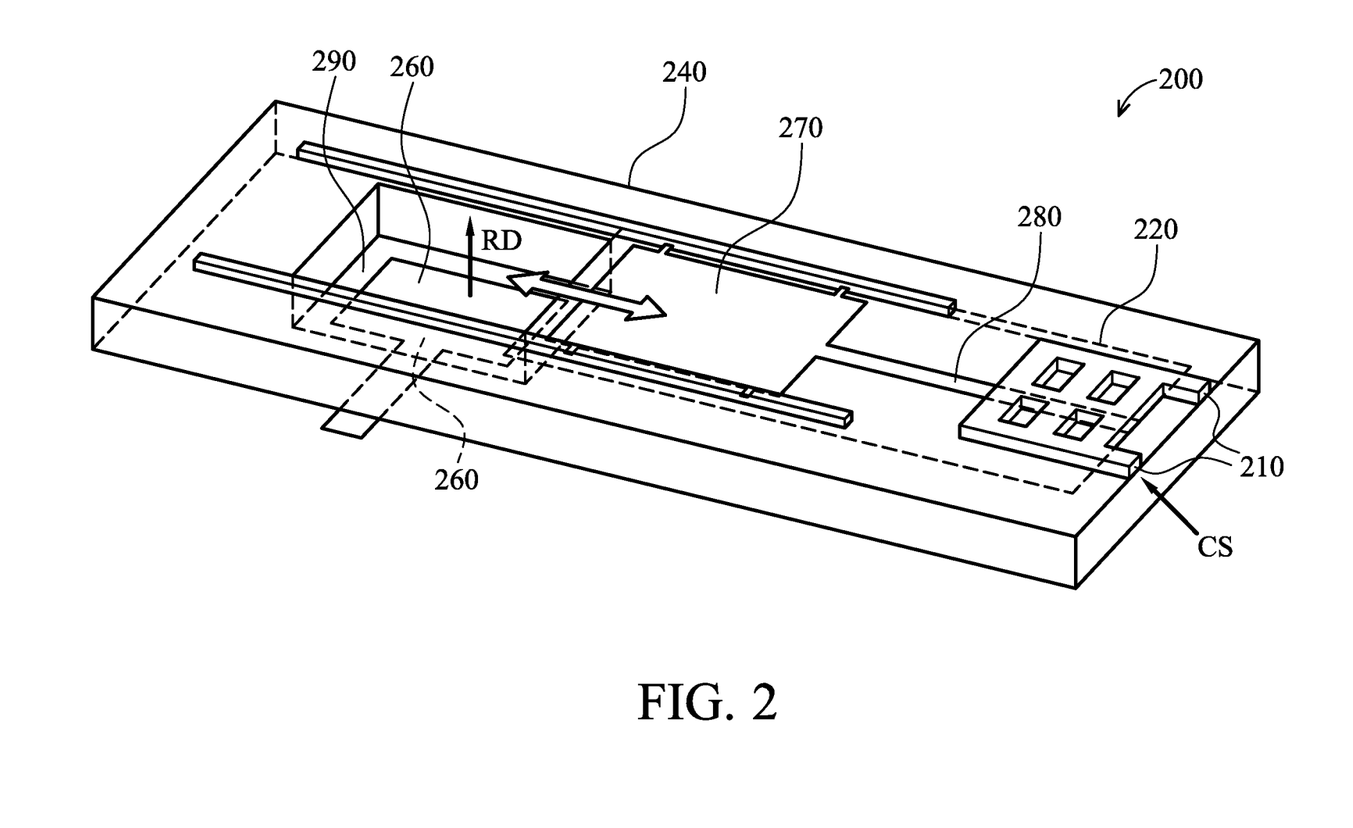
FIG. 2 illustrates an embodiment of a calibration device of the disclosure.

FIG. 2 illustrates an embodiment of a calibration device of the disclosure. As shown in FIG. 2, the calibration device 200 includes an actuator 210, an MEMS unit 220 and the insulation unit 240. The MEMS unit 220 includes a metal plate 270 and a push/pull bar 280. The insulation unit 240 has a groove 290 in which the antenna 260 is disposed, such that the radiation direction of the antenna 260 is along the opening direction RD of the groove 290. In detail, when the metal plate 270 is moved to the opening and is perpendicular to the opening direction RD, the metal plate 270 shields the antenna 260, such that the antenna can not receive the external thermal radiation. The push/pull bar 280 has a first terminal and a second terminal to respectively couple to the metal plate 270 and the actuator 210, such that the metal plate 270 is moved to the opening of the groove 290 and is perpendicular to the opening direction RD to shield the antenna 260 when the actuator 210 pushes or pulls the push/pull bar 280 according to the calibration signal CS.

Figure 3:
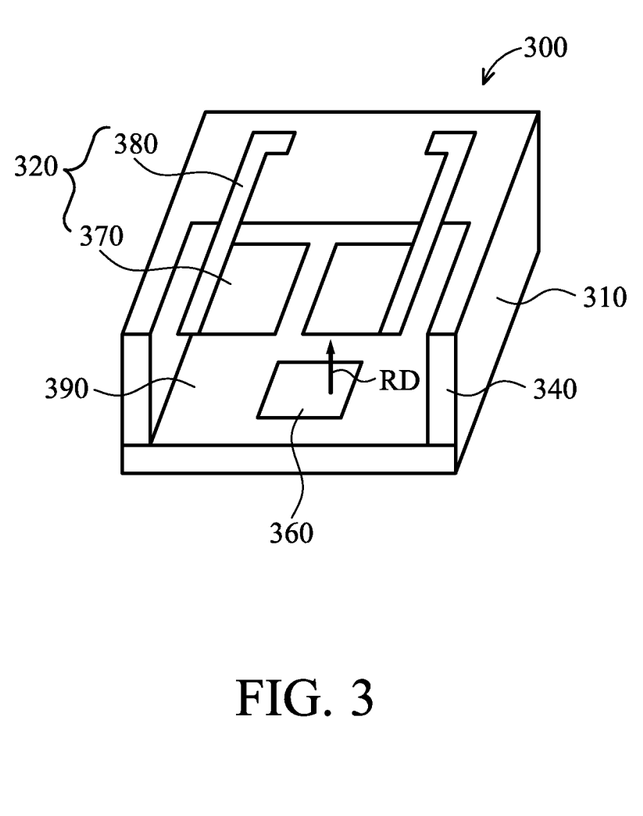
FIG. 3 illustrates another embodiment of a calibration device of the disclosure.

FIG. 3 illustrates another embodiment of a calibration device of the disclosure. As shown in FIG. 3, the calibration device 300 includes an actuator 310, an MEMS unit 320 and an insulation unit 340. The MEMS unit 320 includes a gate 370 and a torsion beam 380. The insulation unit 340 forms a groove 390 in which the antenna 360 is disposed, such that the radiation direction of the antenna 360 is along the opening direction RD of the groove 390. In detail, the metal plate of the gate 370 is similar to the metal plate 270 shown in FIG. 2, in which, when the gate 370 operates in a closed state, the metal plate is perpendicular to the opening direction RD, such that the metal plate shields the antenna 360. When the gate 370 operates in an open state, the metal plate is parallel to the opening direction RD, such that the metal plate can not shield the antenna 360. The torsion beam 380 is coupled between the gate 370 and the actuator 310 to separate the gate 370 and the actuator 310, such that the gate 370 respectively operates in the closed state and the open state when the actuator 310 respectively operates at a first voltage level (e.g., a high voltage level) and a second voltage level (e.g., a low voltage level) according to the calibration signal CS.

In detail, when the control unit 130 applies the first voltage level (e.g., the low voltage level) to the actuator 310 by the calibration signal CS, the gate 370 is moved to a horizontal position by the elasticity of the torsion beam. Thus, the gate 370 is completely closed, such that the metal plate on the gate 370 is moved to the opening of the groove 390 to shield the antenna 360. When the control unit 130 applies the second voltage level (e.g., the high voltage level) to the actuator 310 by the calibration signal CS, the gate 370 is moved to a vertical position by the attraction force of the actuator 310. Therefore, the gate 370 operates in the open state, such that the metal plate on the gate 370 is moved away the opening of the groove 390, so that the antenna 360 can receive the external thermal radiation.

Figure 4:
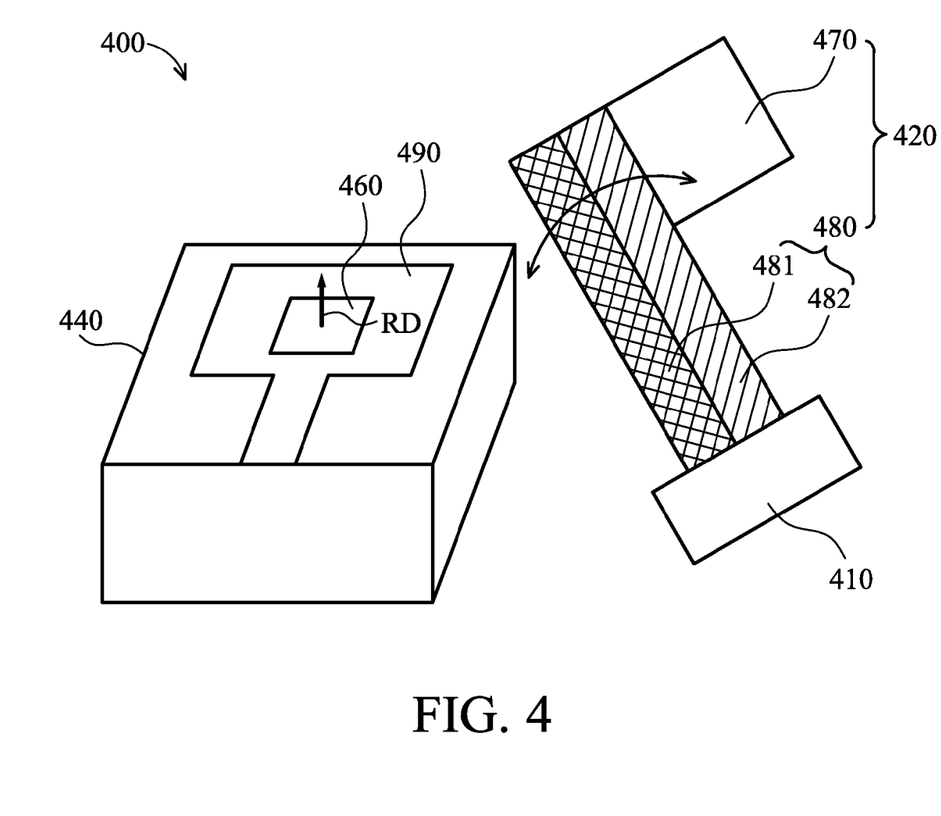
FIG. 4 illustrates another embodiment of a calibration device of the disclosure.

FIG. 4 illustrates another embodiment of a calibration device of the disclosure. The features of the calibration device 400 shown in FIG. 4 are similar to that of the calibration device 200 shown in FIG. 2, and thus, are omitted for brevity. As shown in FIG. 4, the calibration device 400 includes an actuator 410, an MEMS unit 420 and an insulation unit 440. The MEMS unit 420 includes a metal plate 470 and a flexible rod 480. The difference between the calibration devices 400 and 200 is that the flexible rod 480 is formed with two different kinds of materials 481 and 482. Because the flexibility of the material 481 is different from that of the material 482, the flexible rod 480 can flex while the actuator 410 drives the flexible rod 480. Therefore, the metal plate 470 can be moved to the opening of the groove 490 by the flexible rod 480, such that the antenna 460 can be shielded. The metal plate 470 can be moved away the opening of the groove 490 by the flexible rod 480, such that the antenna 460 can receive the external thermal radiation.

Figure 5:
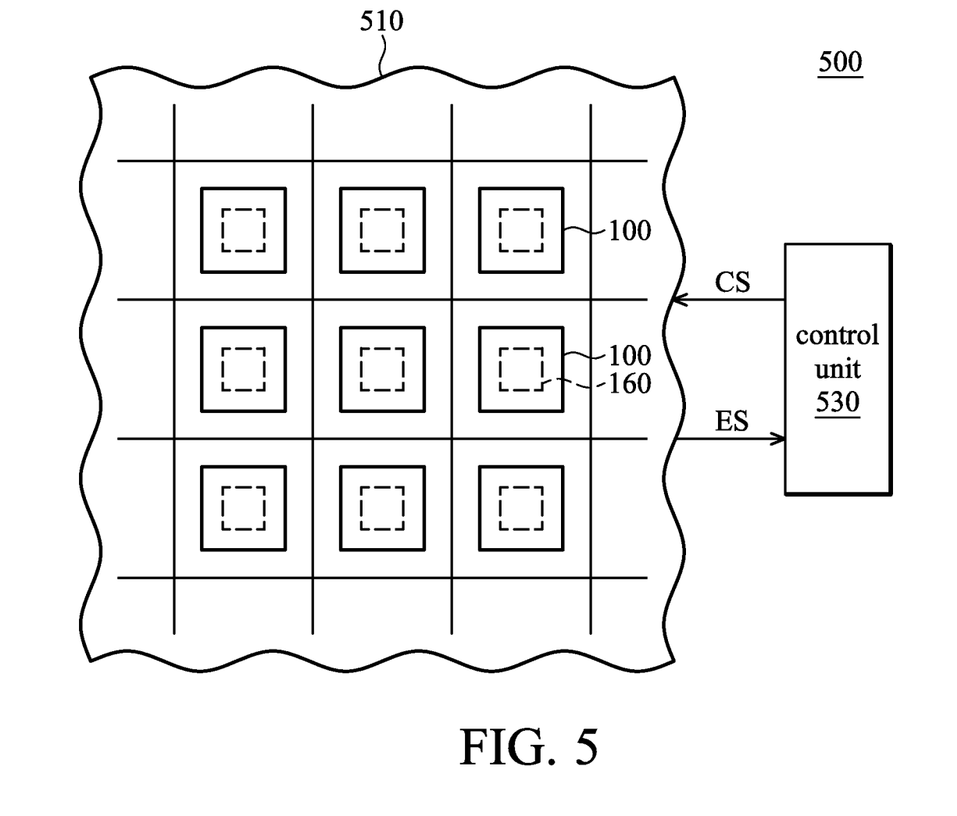
FIG. 5 illustrates a schematic view of a calibration system of the disclosure.

FIG. 5 illustrates a schematic view of a calibration system of the disclosure. As shown in FIG. 5, the calibration system 500 includes a plurality of calibration devices 100 and a control unit 530. The calibration devices 100 of the calibration system 500 are disposed in the radiometer array 510, such that the calibration system 500 and the radiometer array 510 form an array-microwave receiver having calibration features. The features of the calibration device 100 have been illustrated in FIGS. 1-4, and thus, are omitted for brevity. When the calibration system 500 calibrates the radiometer array 510, the control unit 530 outputs the calibration signal CS to the actuator 110 (as shown in FIG. 1) of each of the calibration devices 100, such that the actuator 110 enables the MEMS unit 120 to shield the antenna 160 of the corresponding radiometer 150 according to the calibration signal CS. Therefore, the radiometers 150 generate the environmental signals ES according to the equivalent radiant temperature.

Although the radiometers 150 (the antennas 160) detect the same equivalent radiant temperature in the radiometer array 510, the radiometers 150 output different values of the environmental signals ES since the radiometers 150 have different gains. Therefore, the control unit 530 receives the environmental signals ES to normalize (i.e., calibrate) the gains (e.g., gains of antennas, low noise amplifiers, power detectors and variable gain amplifiers) of the radiometers 150, such that the radiometers 150 generate the same value of the environmental signals ES when the radiometers 150 sense the same equivalent radiant temperature.

Figure 6:
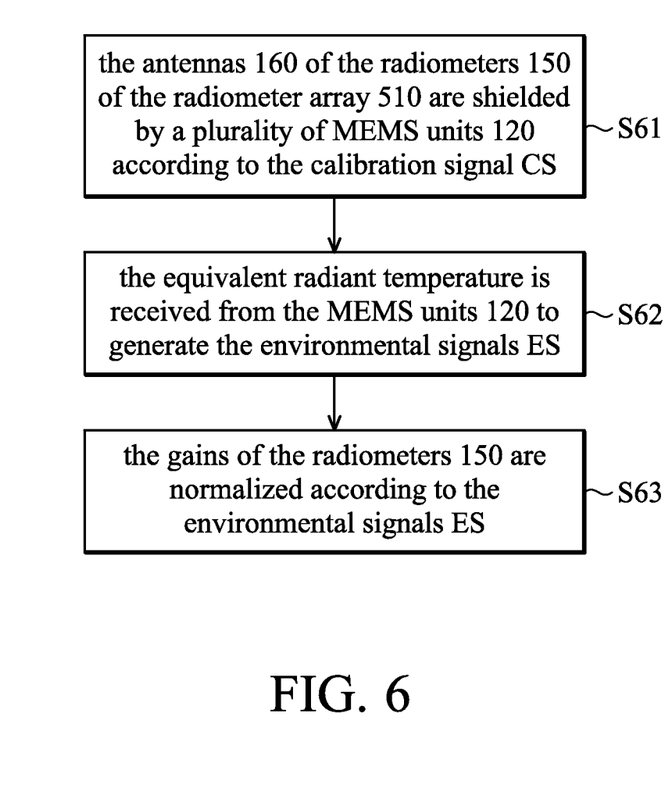
FIG. 6 illustrates a flowchart of a calibration method of the disclosure.

FIG. 6 illustrates a flowchart of a calibration method of the disclosure. As shown in FIG. 6, in step S61, the antennas 160 of the radiometers 150 of the radiometer array 510 are shielded by a plurality of MEMS units 120 according to the calibration signal CS. In step S62, the equivalent radiant temperature is received from the MEMS units 120 to generate the environmental signals ES. In step S63, the gains of the radiometers 150 are normalized according to the environmental signals ES (i.e., the gains of the radiometers 150 are calibrated).

Because the calibration system 500 and the calibration device 100 of the disclosure are formed with micro electromechanical elements (e.g., actuators, insulation units and MEMS units) and the MEMS unit 120 is configured to shield the external thermal radiations, the calibration system 500 having the radiometer array 510 and the calibration device 100 has small sizes and low cost. In addition, the gains of the antenna and the variable gain amplifier in each pixel of the radiometer array are calibrated at the same time to decrease discrepancies there among.

The foregoing has outlined features of several embodiments so that those skilled in the art may better understand the disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and slope of the present disclosure, and that they may make various changes, substitutions and alterations herein without departing from the spirit and scope of the present disclosure.

What is claimed is:

1. A calibration device, capable of calibrating a gain of a radiometer, comprising:
   an actuator, receiving a calibration signal outputted from a control unit; and
   a micro-electromechanical-system (MEMS) unit, coupled to the actuator,
   wherein the actuator enables the MEMS unit to shield an antenna of the radiometer according to the calibration signal, such that the radiometer generates an environmental signal according to an equivalent radiant temperature received from the MEMS unit, and the control unit calibrates the gain of the radiometer according to the environmental signal.

2. The calibration device as claimed in claim 1, further comprising:
   an insulation unit, having a groove in which the antenna is disposed.

3. The calibration device as claimed in claim 1, wherein the radiometer comprises a low noise amplifier, a power detector and a variable gain amplifier.

4. The calibration device as claimed in claim 1, wherein the radiometer is a microwave radiometer.

5. The calibration device as claimed in claim 1, wherein the MEMS unit comprises:
a metal plate, configured to shield the antenna; and
a push/pull bar, having a first terminal and a second terminal respectively coupled to the metal plate and the actuator, such that the metal plate shields the antenna when the actuator pushes or pulls the push/pull bar according to the calibration signal.

6. The calibration device as claimed in claim 1, wherein the MEMS unit comprises:
a gate, having a metal plate, wherein the metal plate shields the antenna when the gate operates in a closed state; and
a torsion beam, coupled between the gate and the actuator to separate the gate and the actuator, such that the gate respectively operates in the closed state and an open state when the actuator respectively operates at a first voltage level and a second voltage level according to the calibration signal.

7. The calibration device as claimed in claim 1, wherein the MEMS unit comprises:
a metal plate, configured to shield the antenna; and
a flexible rod, having a first terminal and a second terminal respectively coupled to the metal plate and the actuator, such that the metal plate shields the antenna when the actuator flexes the flexible rod according to the calibration signal.

8. A calibration system, capable of calibrating gains of a radiometer array having a plurality of radiometers, comprising:
a plurality of calibration devices, arranged in an array form, wherein each of the calibration devices comprises:
an actuator, configured to receive the calibration signal; and
an MEMS unit, coupled to the actuator, wherein the actuator enables the MEMS unit to shield an antenna of the corresponding radiometer according to the calibration signal, such that the radiometer generates an environmental signal; and
a control unit, configured to output the calibration signal, wherein the control unit normalizes the gains of the radiometers according to the environmental signals.

9. The calibration system as claimed in claim 8, wherein each of the calibration devices further comprises an insulation unit having a groove in which the antenna is disposed.

10. The calibration system as claimed in claim 8, wherein each of the radiometers comprises a low noise amplifier, a power detector and a variable gain amplifier.

11. The calibration system as claimed in claim 8, wherein the radiometers are microwave radiometers.

12. The calibration system as claimed in claim 8, wherein the MEMS unit comprises:
a metal plate, configured to shield the antenna; and
a push/pull bar, having a first terminal and a second terminal respectively coupled to the metal plate and the actuator, such that the metal plate shields the antenna when the actuator pushes or pulls the push/pull bar according to the calibration signal.

13. The calibration system as claimed in claim 8, wherein the MEMS unit comprises:
a gate, having a metal plate, wherein the metal plate shields the antenna when the gate operates in a closed state; and
a torsion beam, coupled between the gate and the actuator to separate the gate and the actuator, such that the gate respectively operates in the closed state and an open state when the actuator respectively operates at a first voltage level and a second voltage level according to the calibration signal.

14. The calibration system as claimed in claim 8, wherein the MEMS unit comprises:
a metal plate, configured to shield the antenna; and
a flexible rod, having a first terminal and a second terminal respectively coupled to the metal plate and the actuator, such that the metal plate shields the antenna when the actuator flexes the flexible rod according to the calibration signal.

15. A calibration method, capable of calibrating gains of a plurality of radiometers, comprising:
shielding antennas of the radiometers of a radiometer array by a plurality of MEMS units according to a calibration signal;
receiving an equivalent radiant temperature from the MEMS units to generate environmental signals; and
normalizing gains of the radiometers according to the environmental signals.

16. The calibration method as claimed in claim 15, further comprising:
disposing each of the antennas of the radiometers in a groove of the corresponding calibration device.

17. The calibration method as claimed in claim 15, wherein each of the radiometers comprises a low noise amplifier, a power detector and a variable gain amplifier.

18. The calibration method as claimed in claim 15, wherein the radiometers are microwave radiometers.

19. The calibration method as claimed in claim 15, further comprising:
pushing or pulling a push/pull bar of each of the MEMS units according to the calibration signal, such that a metal plate of the each of the MEMS units shields the corresponding antenna.

20. The calibration method as claimed in claim 15, further comprising:
opening or closing a gate of each of the MEMS units according to the calibration signal, such that a metal plate of the each of the MEMS unit shields the corresponding antenna.

21. The calibration method as claimed in claim 15, further comprising:
flexing a flexible rod of each of the MEMS units according to the calibration signal, such that a metal plate of the each of the MEMS units shields the corresponding antenna.

* * * * *